June 17, 1969 R. K. BRAENDLEIN 3,450,141
COMPRESSION LIMIT CONTROL DEVICE FOR SUPERSONIC INLETS
Filed Aug. 1, 1966

INVENTOR.
ROBERT K. BRAENDLEIN
BY R. E. Geangue
ATTORNEY

INVENTOR.
ROBERT K. BRAENDLEIN
BY R. E. Geangue
ATTORNEY

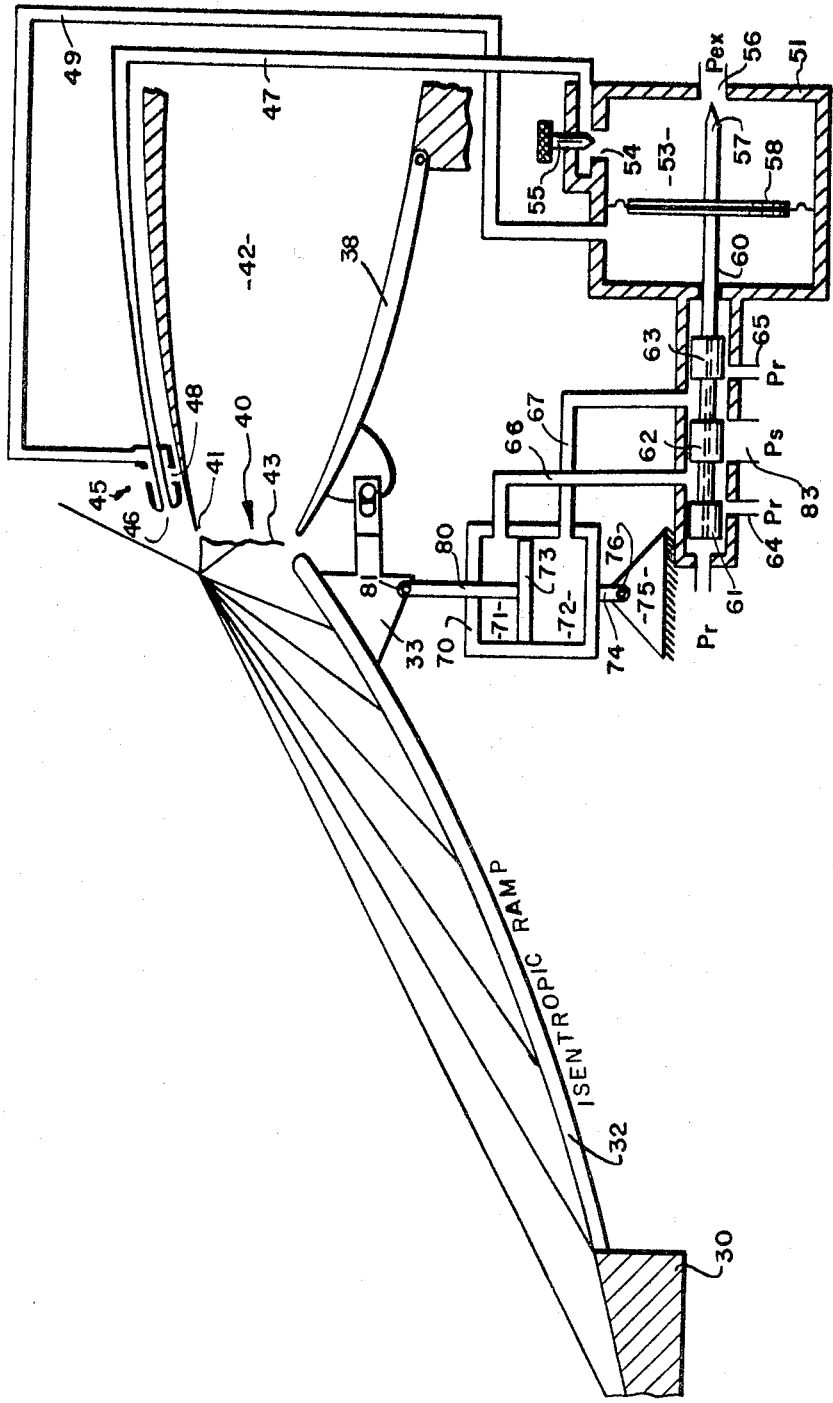

United States Patent Office 3,450,141
Patented June 17, 1969

3,450,141
COMPRESSION LIMIT CONTROL DEVICE FOR SUPERSONIC INLETS
Robert K. Braendlein, Reseda, Calif., assignor to The Marquardt Corporation, Van Nuys, Calif., a corporation of California
Filed Aug. 1, 1966, Ser. No. 569,345
Int. Cl. F02k 7/10, 11/00
U.S. Cl. 137—15.2                    4 Claims

ABSTRACT OF THE DISCLOSURE

The control device utilizes a probe located outside the lip of a supersonic inlet in a region between the shock of the branch shock structure of the inlet and the vortex sheet of the branch shock structure. The probe senses the static and total pressures in this region and maintains a constant ratio between these two pressures by varying the flow deflection angle of the inlet. The magnitude of the constant ratio is selected to operate the inlet at substantially the compression limit at all supersonic Mach numbers.

---

This invention relates to a compression limit control device for supersonic inlets and more particularly to a compression limit control device which operates an external compression supersonic inlet at or near its aerodynamic compression limit for maximum pressure recovery.

Present control devices schedule the deflection angle of the inlet with flight Mach number and are therefore complicated and expensive. The device of the present invention is much simpler than such prior schedule controllers and is therefore smaller, lighter, more reliable and less sensitive to environmental temperature effects. The present invention causes the inlet to operate at or near its aerodynamic compression limit to obtain maximum pressure recovery and utilizes unique, measurable quantities existing at the compression limit as the input signals to the control device. These input signals are directly sensitive to the actual, real, and fundamental aerodynamic limits of the supersonic external compression process. The control device is applicable to any variable inlet using external compression (isentropic or multi-shock) ahead of the terminal shock requiring an inlet control to operate the inlet at or near the compression limit so that maximum inlet pressure recovery is obtained.

In order to obtain the highest possible pressure recovery out of a variable geometry, external compression supersonic inlet, the compression surfaces must diffuse the supersonic flow down to the lowest possible Mach number at the inlet throat. This is done so that the total pressure recovery across the normal shock wave at the throat is maximized, thus resulting in the highest diffuser recovery obtainable. In reaching this goal, aerodynamic compression limits prevail which dictate the minimum Mach number that can be reached at the throat. This aerodynamic limit is the result of specific limitations of the branch shock structure. The region of the branch shock structure located just outside the inlet lip exhibits unique properties which can be utilized in a simple and effective control system to automatically adjust the external compression, variable geometry surface of the inlet for all supersonic Mach numbers so that substantially minimum throat Mach number is obtained ahead of the normal shock wave. Thus, the present control device can automatically operate the variable geometry inlet at or near its aerodynamic limit at all supersonic Mach numbers.

In particular, the present invention maintains a constant value of the ratio of static to total pressure in the region just outside the lip to cause the inlet to operate at about its compression limit at all supersonic Mach numbers. A fraction of the total pressure in the region is continually compared with the static pressure in order to control an actuator which varies the flow deflection angle of the inlet in a direction to maintain the ratio constant. It is understood that the present invention is not utilized to position the normal shock since this can be accomplished by another control associated with the inlet.

It is therefore an object of the present invention to provide a simple and reliable compression limit control device for supersonic inlets which produces maximum pressure recovery by diffusing the supersonic flow down to substantially the lowest possible Mach number at the inlet throat.

Another object of the present invention is to provide a compression limit control device for supersonic inlets which is responsive to conditions occurring in the branch shock structure.

Another object of the invention is to provide a compression limit control device which is responsive to the ratio of static to total pressure in the region just outside the cowl lip of an external compression inlet, and which maintains this ratio constant in order to operate the inlet at substantially the compression limit at different supersonic Mach numbers.

These and other objects of the invention not specifically set forth above will become readily apparent from the accompanying description and drawings in which:

FIGURE 8 is a sectional view along line 8—8 of FIGURE 7 and illustrating the control system for the ramp.

Figure 1:
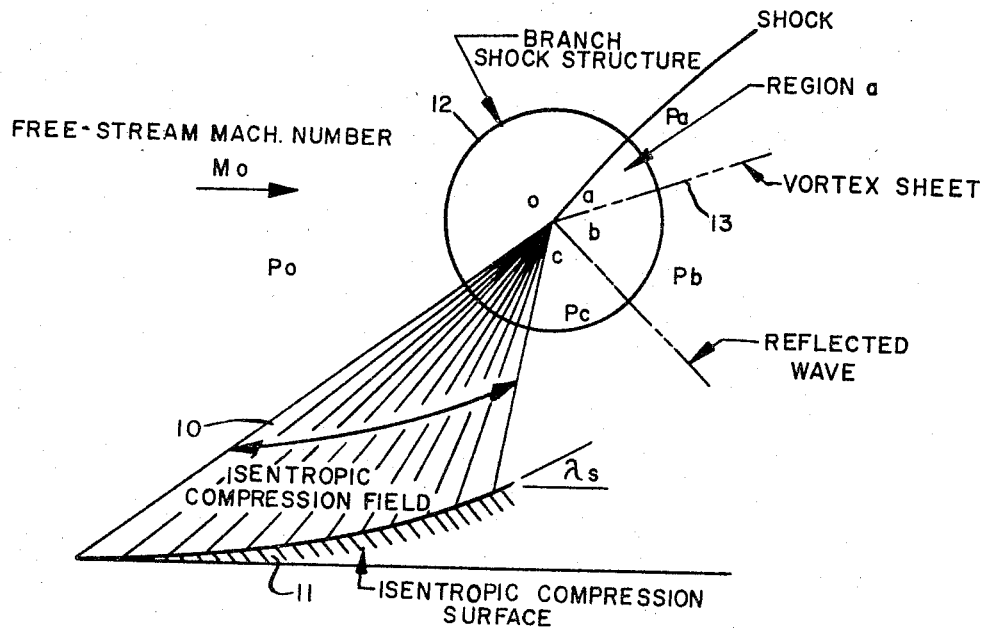
FIGURE 1 is a schematic illustration of the branch shock structure adjacent an isentropic compression surface showing the pressure regions $a$, $b$, $c$ and $o$.

Referring to FIGURE 1, an isentropic compression field 10 is associated with an isentropic compression surface 11 and the branch shock structure 12 associated with the compression surface has regions $a$, $b$, $c$ and $o$. The region $o$ is at substantially free stream conditions while the region $a$ is separated from the region $b$ by a vortex sheet 13 since the velocity in region $a$ is lower than the velocity in region $b$. The nature of an external compression inlet aerodynamic limit is comprehensively discussed in Report No. NACA TN 3589, entitled Design Criteria for Axisymmertic and Two-Dimensional Supersonic Inlets and Exits.

Figure 2:
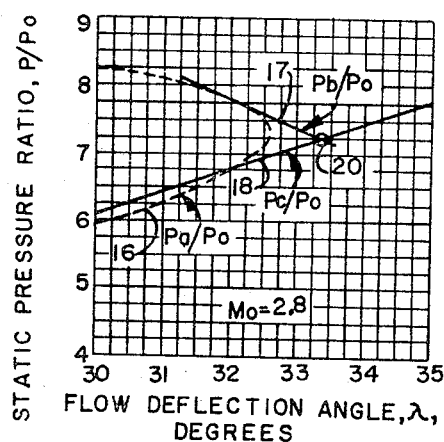
FIGURE 2 is a plot of the static pressure ratio in the various regions of FIGURE 1 against flow deflection angle for Mach number of 2.8.
Figure 3:
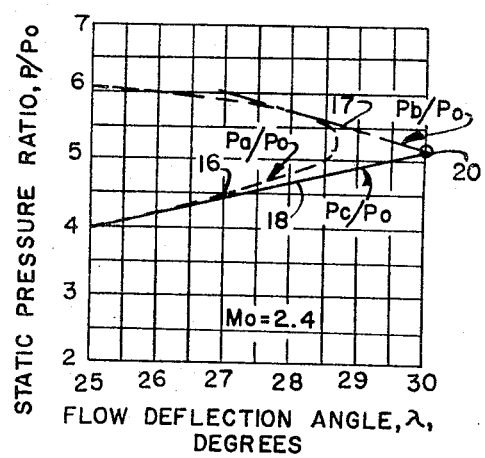
FIGURE 3 is a plot similar to FIGURE 2 for a Mach number of 2.4.

The theoretical pressure-deflection polars of the branch shock system at free stream Mach numbers of 2.8 and 2.4 are shown in FIGURES 2 and 3, respectively, for a two-dimensional isentropic inlet. In these figures, the ratio of static pressure in regions a, b and c to free stream static are plotted as curves 16, 17 and 18, respectively, the plot of $P_c/P_o$ being the isentrope, the plot of $P_a/P_o$ being the oblique shock polar and the plot of $P_b/P_o$ being the reflected wave polar. At the aerodynamic limit of the compression process, the reflected wave polar $P_b/P_o$ is tangent to the oblique shock polar $P_a/P_o$. The point 20 where the reflected wave polar intercepts the isentrope denotes the maximum isentropic flow turn that can be achieved to result in the minimum achievable Mach number at the inlet throat ahead of the normal shock wave.

Figure 4:
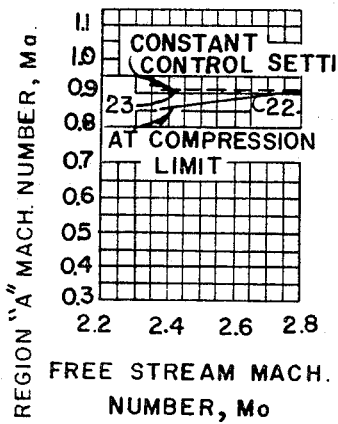
FIGURE 4 is a plot of the Mach number in region $a$ of FIGURE 1 at the compression limit against free stream Mach number.
Figure 5:
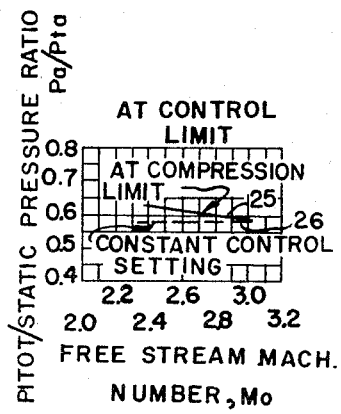
FIGURE 5 is a plot of the static to total pressure ratio for region $a$ against free stream Mach number.

In FIGURE 4, the Mach number of region $a$ is illustrated between the free stream Mach range of 2.4 to 2.8 by the solid line 22 and it is noted that the Mach number is nearly constant when compared with the dotted line 23 which represents a constant Mach number control. Similarly, FIGURE 5 illustrates the static to total pressure ratio at the compression limit for region $a$ over the Mach number range of 2.4 to 2.8 and it is noted that this ratio, as illustrated by the solid line 25, is nearly constant when compared with the dotted line 26 for a constant control setting.

Figure 6:
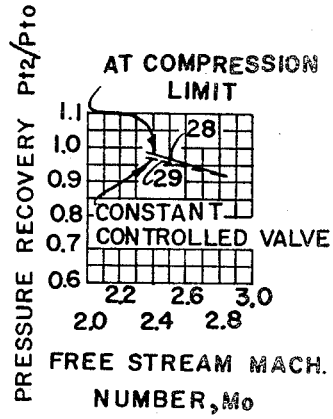
FIGURE 6 is a plot of inlet pressure recovery against free stream Mach number.

The present control device maintains a constant ratio of static to total pressure for region $a$ by changing the isentropic flow deflection angle of the variable geometry inlet. The pressure recovery ($P_{t2}/P_{t0}$) obtained by the device is shown by the solid line 28 of FIGURE 6 whereas the controlled value is represented by the dotted line 29. It is noted that the controlled recovery illustrated by line 28 is 1/3% less than the recovery at the compression limit provided by the present device at Mach 2.4. This variation results from holding the pressure ratio of region $a$ constant when it is in fact slightly variable at the compression limit. However, this deviation is acceptable for practical application.

Figure 7:
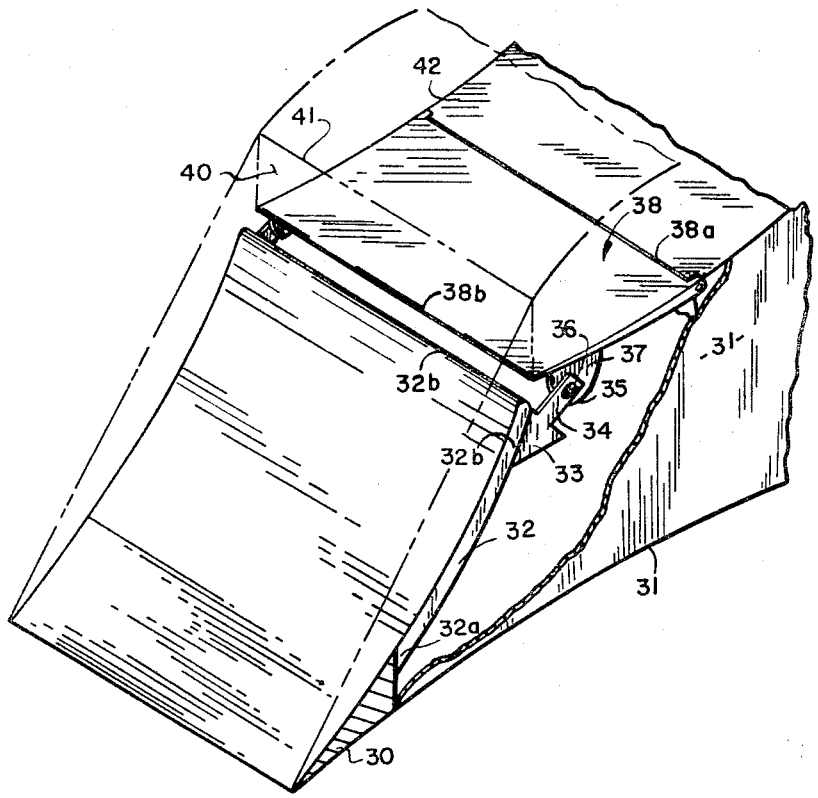
FIGURE 7 is a perspective view of a two-dimensional isentropic inlet having a single variable ramp located ahead of the diffuser inlet.

A typical two-dimensional isentropic inlet is illustrated in FIGURE 7 and comprises a solid wedge portion 30 which is fixed to the supporting structure 31. A flexible ramp surface portion 32 is rigidly connected at end 32$a$ to the wedge 30 and the other end 32$b$ carries a bracket 33 having a projection 34 containing a slit opening 35. This opening receives a pin 36 carried by bracket 37 attached to a movable inlet surface 38 which is pivoted at edge 38$a$ to the structure 31. This linkage maintains the outer edge 38$b$ of surface 38 adjacent the outer edge 32$b$ of the ramp surface 32 while the ramp surface is moved to vary the deflection angle. The inlet opening 40 is defined by the cowl lip 41 and passage 42 connects the inlet opening with the combustion chamber of the engine. At all Mach numbers and ramp angles, it is desired to maintain the normal shock 43 at the inlet lip and this is accomplished by suitable controls (not shown).

The probe 45 for sensing the total and static pressure in region $a$ just outside the lip 41 is illustrated in FIGURE 8 and the probe is located ahead of the shock wave off the inlet lip. Probe opening 46 senses total pressure which is communicated to passage 47 and side openings 48 sense static pressure which is communicated to passage 49. A diaphragm 50 divides chamber 51 into spaces 52 and 53 and the static pressure passage 49 communicates with space 52 while the total pressure passage 47 communicates with space 53 through an orifice 54 which is restricted by an adjustable needle valve 55. Space 53 is connected to ambient surroundings by discharge orifice 56 located in casing 51 and the area of orifice 56 is variated by a needle 57 attached to the diaphragm 50. Thus, the area of orifice 56 varies with the position of the diaphragm 50 while the area of orifice 54 remains fixed at a selected value determined by the setting of the needle valve 55.

The fixed orifice 54 and the variable orifice 56 form the two orifices of a pressure divided device such as illustrated in U.S. Patent No. 2,645,240 granted July 14, 1952, to John A. Drake. The pressure in space 53 is some fraction of the total pressure on line 42 as determined by the ratio of the orifice areas. The diaphragm 50 is connected to a shaft 60 carrying the valve portions 61, 62 and 63 which control the flow of fluid from pressure lines 64 and 65 to actuator lines 66 and 67, respectively. Actuator 70 has chambers 71 and 72 which are located on opposite sides of an actuator piston 73 and which are connected with lines 66 and 67, respectively. Mounting arm 74 on the bottom of the actuator is pivotally connected at its end to supporting bracket 75 by means of pin 76. A piston rod 80 for piston 73 is pivotally connected at its end to the bracket 33 by pivot pin 81 so that movement of the piston 73 will vary the flow deflector angle of the ramp surface 32 by bending the ramp.

In operation, if the static to total pressure ratio increases above the selected value, the diaphragm 50 will move to the left in FIGURE 8 and will move the valve portions 61, 62 and 63 to permit pressurized fluid to flow from line 64 to line 66 and chamber 71. Also, chamber 72 is connected to exhaust line 83 so that piston 73 will move the ramp surface 32 inwardly toward the axis of the inlet. The inward movement of the ramp surface will continue until the selective ratio of pressures is again present in region $a$ at which time the diaphragm 50 will become centered and will null the valve portions to maintain the ramp at the new deflection angle. If the pressure ratio decreases from the selected value, pressure fluid will flow from line 65 to line 67 and chamber 72 and, will cause piston 73 to move the ramp surface outwardly until the selected pressure ratio is again present in region $a$. At this time the diaphragm 50 will become centered and the valve portions will be nulled. Thus, the ramp surface 32 will be continually maintained at an angle which produces the selected constant pressure ratio in the region $a$, where the probe 45 is located.

Basically, the control system is a null seeker since the actuator is at rest only when the servo valve is at null and the pressure ratio is at the desired value. When the signal pressure ratio is at the predetermined set value the control system assumes its null condition and the actuator 73 stops moving. Since the control system maintains a constant pressure ratio between the total and static pressure in region $a$, the ramp assumes different positions at different Mach numbers. The pressure ratio settings of the controller determined by the setting of needle valve 55 is chosen so that the ramp position is at or near the inlet compression limit at all supersonic Mach numbers to provide maximum inlet pressure recovery at all Mach numbers.

The present invention therefore provides a simple and reliable control system which is smaller and lighter than prior ramp angle controls and less sensitive to environmental temperature effects. The control signals are unique measurable quantities at the compression limit to provide maximum inlet recovery. As previously stated, the control system is applicable to any variable supersonic inlet using external compression and is applicable to inlets in which more than one ramp is utilized. Also, other devices can be utilized to sense and compute the control pressure ratio and to move the ramp surface. Various other modifications are contemplated by those skilled in the art without departing from the spirit and scope of the invention as hereinafter defined by the appended claims.

What is claimed is:
1. A compression limit control device for a supersonic external compression inlet comprising:
   an entrance for said inlet having a lip and an external compression surface forward of said entrance movable to vary the flow deflection angle of the surface;
   said control device comprising probe means located outside the inlet adjacent said entrance lip, said probe means comprising a total pressure probe and a static pressure probe; and
   actuator control means responsive to a selected ratio of the static and total pressures sensed by said probe means for positioning said surface and maintaining said ratio constant at different flight Mach numbers, said probe means being located in the region between the shock of the branch shock structure of the inlet and the vortex sheet of the branch shock structure of the inlet.

2. A compression limit control device as defined in claim 1 wherein said actuator control means comprises:
a diaphragm located in a chamber;
means for connecting said static pressure probe to the chamber space on one side of said diaphragm;
means for connecting the chamber space on the opposite side of said diaphragm to said total pressure probe through a first orifice;
a second discharge orifice connected with said opposite side chamber space; and
valve means carried by said diaphragm for varying the size of said second orifice.

3. A compression limit control device as defined in claim 1 having means for selecting the magnitude of said constant pressure ratio to position and surface substantially at the inlet compression limit at different Mach numbers.

4. A compression limit control device as defined in claim 1 having means for selecting the magnitude of said constant pressure ratio, said selecting means comprising an adjustable needle valve in said first orifice.

References Cited

UNITED STATES PATENTS 2,997,843　8/1961　Arnett _____ 137—15.2

ALAN COHAN, *Primary Examiner.*